United States Patent
Rama Raju

(10) Patent No.: US 10,608,502 B2
(45) Date of Patent: Mar. 31, 2020

(54) INSTANT ENERGY SYSTEM

(71) Applicant: Champati Rama Raju, Andra Pradesh (IN)

(72) Inventor: Champati Rama Raju, Telangana (IN)

(*) Notice: Subject to any disclaimer, the term of this patent is extended or adjusted under 35 U.S.C. 154(b) by 0 days.

(21) Appl. No.: 15/324,733

(22) PCT Filed: Feb. 23, 2015

(86) PCT No.: PCT/IN2015/000102
§ 371 (c)(1),
(2) Date: Jan. 9, 2017

(87) PCT Pub. No.: WO2016/067300
PCT Pub. Date: May 6, 2016

(65) Prior Publication Data
US 2017/0229938 A1     Aug. 10, 2017

(30) Foreign Application Priority Data

Oct. 30, 2014 (IN) .......................... 5403/CHE/2014

(51) Int. Cl.
| | |
|---|---|
| *H02K 7/18* | (2006.01) |
| *F15B 11/08* | (2006.01) |
| *F02B 75/02* | (2006.01) |
| *F03G 7/10* | (2006.01) |
| *F15B 1/26* | (2006.01) |

(52) U.S. Cl.
CPC ............. *H02K 7/1807* (2013.01); *F03G 7/10* (2013.01); *F15B 1/26* (2013.01); *F15B 11/08* (2013.01); *F02B 2075/025* (2013.01); *F15B 2211/20515* (2013.01); *H02K 7/1853* (2013.01); *H02K 7/1861* (2013.01); *Y10S 415/916* (2013.01)

(58) Field of Classification Search
CPC ......... H02K 7/1807; F15B 1/26; F15B 11/08; F15B 2211/20515; Y10S 415/916; F03B 17/005; F03B 17/04
See application file for complete search history.

(56) References Cited

U.S. PATENT DOCUMENTS

| | | | | |
|---|---|---|---|---|
| 4,115,034 | A * | 9/1978 | Smith | F03B 13/24 417/231 |
| 4,541,243 | A * | 9/1985 | Clark | F02B 75/04 417/380 |
| 4,590,767 | A * | 5/1986 | Gardner, Jr. | F02G 1/04 180/165 |
| 5,970,713 | A * | 10/1999 | Iorio | F03G 3/00 60/640 |
| 7,005,757 | B2 * | 2/2006 | Pandian | F03G 5/00 290/1 R |

(Continued)

*Primary Examiner* — Michael C Zarroli

(57) ABSTRACT

A non-polluting, zero hazardous gas emission electricity generating hybrid system is provided with a hydraulic pressure drive cylinder. To one end of the linear movement drive cylinder is connected with a fluid reservoir containing the fluid to be supplied to the drive cylinder. The fluid from the reservoir is pressured through the inlet pipes by the mechanical pump electrically connected to the motor positioned on top of the said fluid reservoir. To the other end of the linear movement drive cylinder is provided an outlet means for collecting the said fluid into the fluid reservoir enabling the linear movement for the hydraulic cylinder.

7 Claims, 9 Drawing Sheets

(56) References Cited

U.S. PATENT DOCUMENTS

| | | | | |
|---|---|---|---|---|
| 8,441,139 B2* | 5/2013 | Karimi | .................... | F03D 9/007 |
| | | | | 290/53 |
| 2008/0110168 A1* | 5/2008 | Gracia Lopez | ..... | F03B 13/1815 |
| | | | | 60/497 |
| 2013/0111887 A1* | 5/2013 | Kwok | .................... | F03B 17/04 |
| | | | | 60/325 |
| 2015/0143805 A1* | 5/2015 | Azegami | ................ | F03B 17/04 |
| | | | | 60/495 |

* cited by examiner

INSTANT ENERGY SYSTEM

FIELD OF THE INVENTION

This invention relates to the field of energy generation and more specifically to energy generation systems and methods based on mechanical/hydraulic and pressure differential principles and reverse gear mechanism.

BACKGROUND OF THE INVENTION

Apparatuses and systems for converting a source of energy to useful power for generating electricity have been generally available for many years. A common arrangement for generating electricity is a large power plant that delivers the produced electricity to the end user over long distance transmission lines. As is commonly known, such power plants are very complicated and very expensive, requiring large capital investment in the power plant and the transmission lines. Presently, most large power plants rely on traditional sources of energy, such as oil, natural gas, coal, nuclear, stored water and the like to produce electricity. There is a strong effort to provide alternative apparatuses and systems to power machines, particularly generators for producing electricity, that utilize energy sources which have little or nil environmental impact, generally by being more readily available, cleaner and, preferably, renewable. For instance, many people and organizations have been attempting to utilize wind, solar, tidal and geothermal resources as a source of power to operate generators for the production of electricity. Although such sources of energy have been well known and, to some extent, in use for many years, it has only been relatively recent that substantially increased efforts have been directed towards improving the efficiency of these energy systems so they may be capable of generating more electricity. Currently, such alternative energy systems are a relatively small percentage of the total electricity production.

The increase in demand for electricity will have to be supplied by those apparatuses and systems that are available, which, at least presently, primarily rely on hydrocarbon-based fuels to provide the necessary power. As the need for electricity increases, the supply of fossil fuels to produce electricity is further reduced, the environmental impacts of these fuels worsen and the cost of using electricity increases. Even though the cost of electricity is anticipated to rise and there may be availability problems, most experts expect that the demand for electricity will substantially increase during the foreseeable future. In fact, consumers generally expect that electricity will be available to them when they need it, whether to operate an appliance, energize a light source or drive a machine.

Hence there is a need for a system and method that utilize nil fossil fuels and renewable energy for the continuous production of power preferably converting the mechanical and kinetic energy to electrical power. An analysis of the various patent documents provides JP2008063888 providing a hybrid type construction machine capable of efficiently regenerating kinetic energy of an inertia body, without causing a shock in a hydraulic system and an electric system, when switching driving-regenerative control, when starting or stopping a hydraulic actuator. The pressure oil from a variable displacement pump is supplied to and discharged from a turning hydraulic motor via lines A and B from a switching control valve. A rotary shaft of a power generation electric motor and a rotary shaft of the hydraulic motor are mechanically joined, and are joined to a speed reduction gear mechanism, and are also joined to a swivel base being a rotary inertia body. When decelerating and braking the swivel base, an opening-closing valve is put in an opening state by a command signal Sd from a control means, and kinetic energy of the swivel base is stored in a capacitor as electric energy generated by driving a motor-driven generator as a generator. The ratio of braking torque between the motor-driven generator and the hydraulic motor in braking is determined by being associated to differential pressure between pressures PA and PB.

Also the patent document JPH03229082 discloses an electrohydraulic torque generator set up in a two-storied arrangement and at the first floor, these are provided with an electric motor, a hydraulic pump a relief valve, a pressure tank and a rocking motor, while a poppet type solenoid valve and accessories are set up at the second floor. As for the rocking motor, a rack-and-pinion type rocking motor excellent in mechanical efficiency is adopted, and a piston pump is set up in the hydraulic pump. In addition, a pressure cylinder is attached to a pressure tank, and working fluid in the tank is always pressurized as far as about 0.5 kg/cm. Since a hydraulic system is packaged at each individual valve like that, inboard hydraulic piping work becomes disused and, what is more, power for a hydraulic source will get off with smallness, so that such a system as low in noise is securable.

But none of the inventions disclose a system with hydraulic pressure cylinders moving through the rack and pinion wheel arrangement for converting the linear and vertical movement into the force required for driving the gears generating electric power and the continuous double cyclic operating cylinders through the fluid pressure flow between them.

SUMMARY OF THE INVENTION

A non-polluting, zero hazardous gas emission electricity generating hybrid system is provided with a hydraulic pressure drive cylinder. To one end of the linear movement drive cylinder is connected with a fluid reservoir containing the fluid to be supplied to the drive cylinder. The fluid from the reservoir is pressured through the inlet pipes by the mechanical pump electrically connected to the motor positioned on top of the said fluid reservoir. To the other end of the linear movement drive cylinder is provided an outlet means for collecting the said fluid into the fluid reservoir enabling the linear movement for the hydraulic cylinder.

The linear movement of the hydraulic cylinder is executed by the provision of rack assembly comprising of opposed, spaced apart longitudinal portions joined by curved end portions, arrayed to form a substantially continuous engaging surface and pinion wheel arrangement in a vertical direction. The accumulated hydraulic pressure in the drive cylinder induces its vertical downward movement along the rack and pinion wheel arrangement. The reverse movement of the hydraulic drive cylinder is controlled by the lever mechanism connected at the rear end of the rack arrangement.

The pinion wheel arrangement is mechanically coupled to the transmission gears and the drive gears fitted in the frame encompassing the rack and pinion wheel arrangement. The gears are actuated by the mechanical linear and vertical movement of the hydraulic pressure drive cylinder for converting the mechanical energy into electrical energy. The generated electrical energy is stored and transmitted to the required destination through the transmission gear. The drive gear couples a part of the generated electrical power to the electric motor installed on the fluid reservoir for automating the supply of the fluid from the reservoir to the hydraulic pressure drive cylinder.

The other embodiment of the invention comprises at least two hydraulic pressure cylinders operating in the bicycle mode for the generation of electricity. The two cylinders are connected through a fly wheel mechanism engaging a connecting rod at its centre. The flow of the fluids between the said cylinders generates the bicycle movement resulting in the continuous operation of the system for power production.

Object of the Invention

An object of the present invention is to suitably hybridize a power generating system with a hydraulic pressure drive device having hydraulic inlet and outlets allowed to operate against and by external fluid pressure. Moreover, another object of the present invention is to provide a hydraulic drive cylinder best suited to hybridization.

It is also a further object of the present invention to provide a system with horizontal and vertical movement capability for the hydraulic pressure driven cylinder aiding in the generation of electricity.

It is one another object of the present invention to provide a rack and pinion wheel arrangement encompassed in a frame for the free flow motion of the hydraulic cylinder in the vertical linear direction.

It is yet another object of the present invention to provide gear mechanisms for driving the electric motors controlling the reservoir pumps and for converting the mechanical energy into electrical energy that are stored and transmitted to the desired locations.

It is a final object of the present invention to utilise at least double hydraulic pressure cylinders operating continuously in the bicycle mode through the flow of fluid between the inlet of first cylinder and the outlet of the second cylinder and vice versa.

Statement of the Invention

A non-polluting human powered hybrid vertical machine with hydraulic drive cylinder for energy generation and transmission comprises of
i) A mechanical drive pump (1a) connected to the fluid reservoir (1b) fitted with drive motor (1c) for injecting the said fluid through the conduits.
ii) A vertical hydraulic cylinder (2) with a lower input means for in letting the said fluid from the said reservoir and a top closed output means for out letting the said fluid back to the fluid reservoir and thus allowed to be extended and contracted by the inlet, outlet load.
iii) A perpendicular frame (3) for supporting the said vertical power generating machine encompasses the said cylinder at the top end.
iv) A rack assembly comprising of opposed, spaced apart longitudinal portions joined by curved end portions, arrayed to form a substantially continuous engaging surface and pinion wheel arrangement (4) provided in the said frame (3) perpendicularly below the said vertical cylinder (2) for facilitating the down movement of the said cylinder upon the hydraulic pressure.
v) A lever mechanism (5) provided at bottom end of the said rack and pinion arrangement (4) for arresting the reverse upward movement of the vertical cylinder (2).
vi) A transmission gear (6) provided at the rear end of the arrangement (4) for storing and transmitting the generated electrical energy through the mechanical movement of the said vertical cylinder (2).
vii) A drive gear (7) for driving the said pump (1a) through the electrical drive (1c) for automating the flow of the fluid to and from the fluid reservoir.

A non-polluting human powered hybrid horizontal machine with dual hydraulic drive cylinder for energy generation and transmission comprises
i) At least two horizontal hydraulic cylinders (2a, 2b) with inlet mechanism for receiving the fluid from the fluid reservoir (1b).
ii) At least two inputs and two outputs provided at the either ends of the said horizontal hydraulic cylinders (2a, 2b).
iii) At least two flexible connecting conduits engaging the input of cylinder (2a) with the output of the cylinder (2b) and the output of cylinder (2a) with the input of the cylinder (2b).
iv) A connecting rod (8) positioned in between the said at least two horizontal hydraulic double cylinders (2a, 2b).
v) Fly wheels (25) engaged with the said connecting rod for providing the bicycle mechanism movement to the said double cylinders
vi) A fluid reservoir (1b) containing the fluid positioned at the first end of the said hydraulic cylinder (2) being driven mechanically by the pump (1a).
vii) Electric motors and/or drive chains (1c) electrically connected to the said pump (1a) is supplied power by the driver gear (7).
viii) A transmission gear (6) in driving contact with the said pinion wheel arrangement (4) for converting the mechanical movement of the said hydraulic horizontal cylinder (2) into electrical energy.

A method of generating pollution free electrical energy by the mechanical movement of the hydraulic pressure cylinder comprises the steps of
i) Manually engaging the hand pump (1a) for the supply of the fluid stored in the fluid reservoir (1b) through the inlet means.
ii) Gradually increasing the hydraulic pressure in the cylinder (2) through the fluid input at the inlet means.
iii) Activating the mechanical movement of the said hydraulic cylinder (2) over the rack assembly comprising of opposed, spaced apart longitudinal portions joined by curved end portions, arrayed to form a substantially continuous engaging surface and pinion wheel arrangement (4) provided in the said frame (3).
iv) Controlling the position and movement of the said cylinder (2) by means of the lever mechanism (5).
v) Consequently driving the transmission gear assembly (6) and the driver gear assembly (7) for storing and transmitting the generated electrical energy and for initiating the automatic operation of the said pump (1a).

DETAILED DESCRIPTION OF THE DRAWINGS

With reference to the figures where like elements have been given like numerical designations to facilitate the reader's understanding of the present invention, the preferred embodiments of the present invention are set forth below. The enclosed text and drawings are merely illustrative of a preferred embodiment and represent one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are directed generally to use of the present invention as a double cylinder balanced power generator, those skilled in the art will readily understand that this is merely for purposes of simplifying the present disclosure and that the present invention is not so limited.

Figure 1:
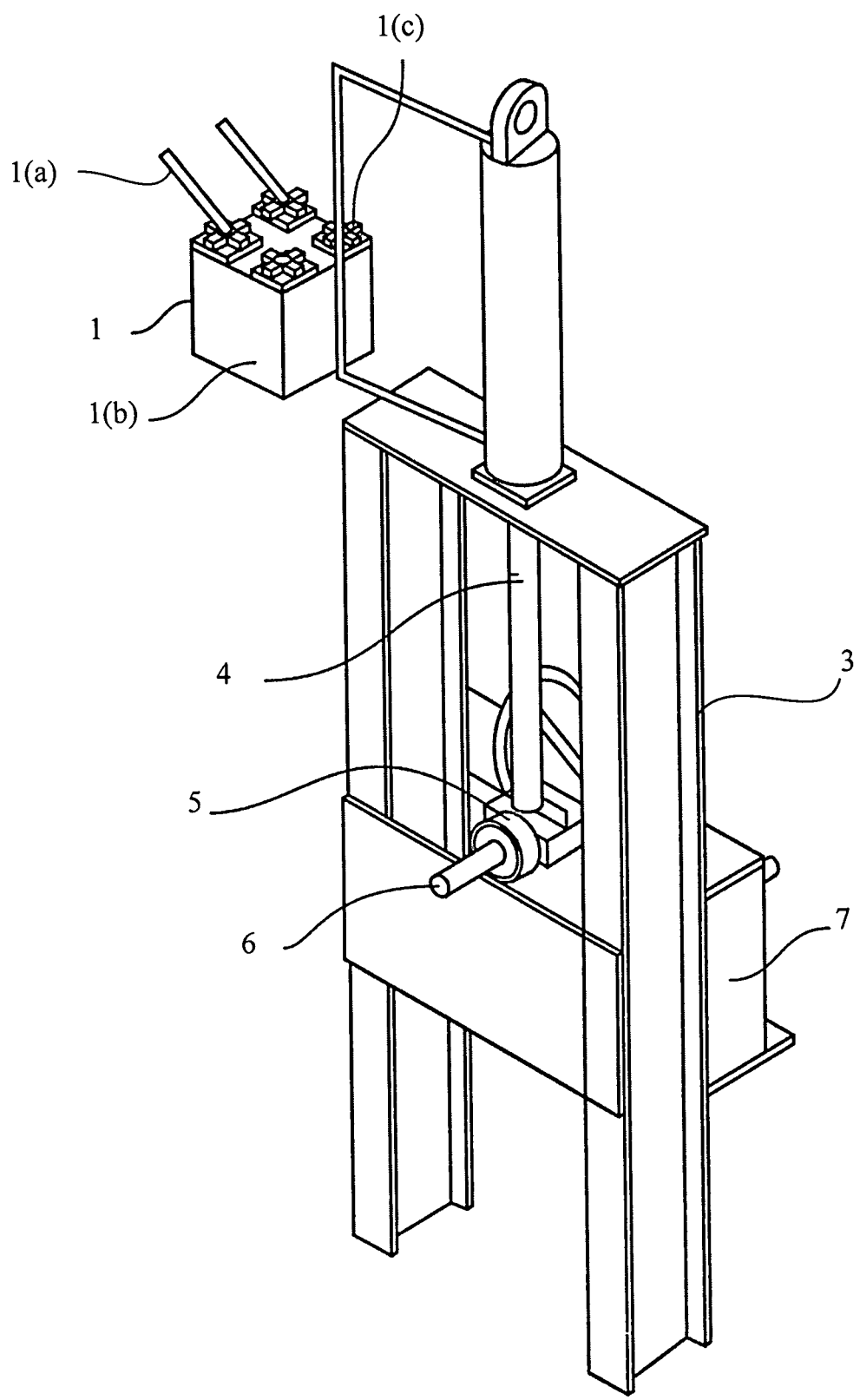
FIG. 1 is the perspective view of the system utilising the hydraulic pressure cylinders for the generation of electricity.
Figure 2:
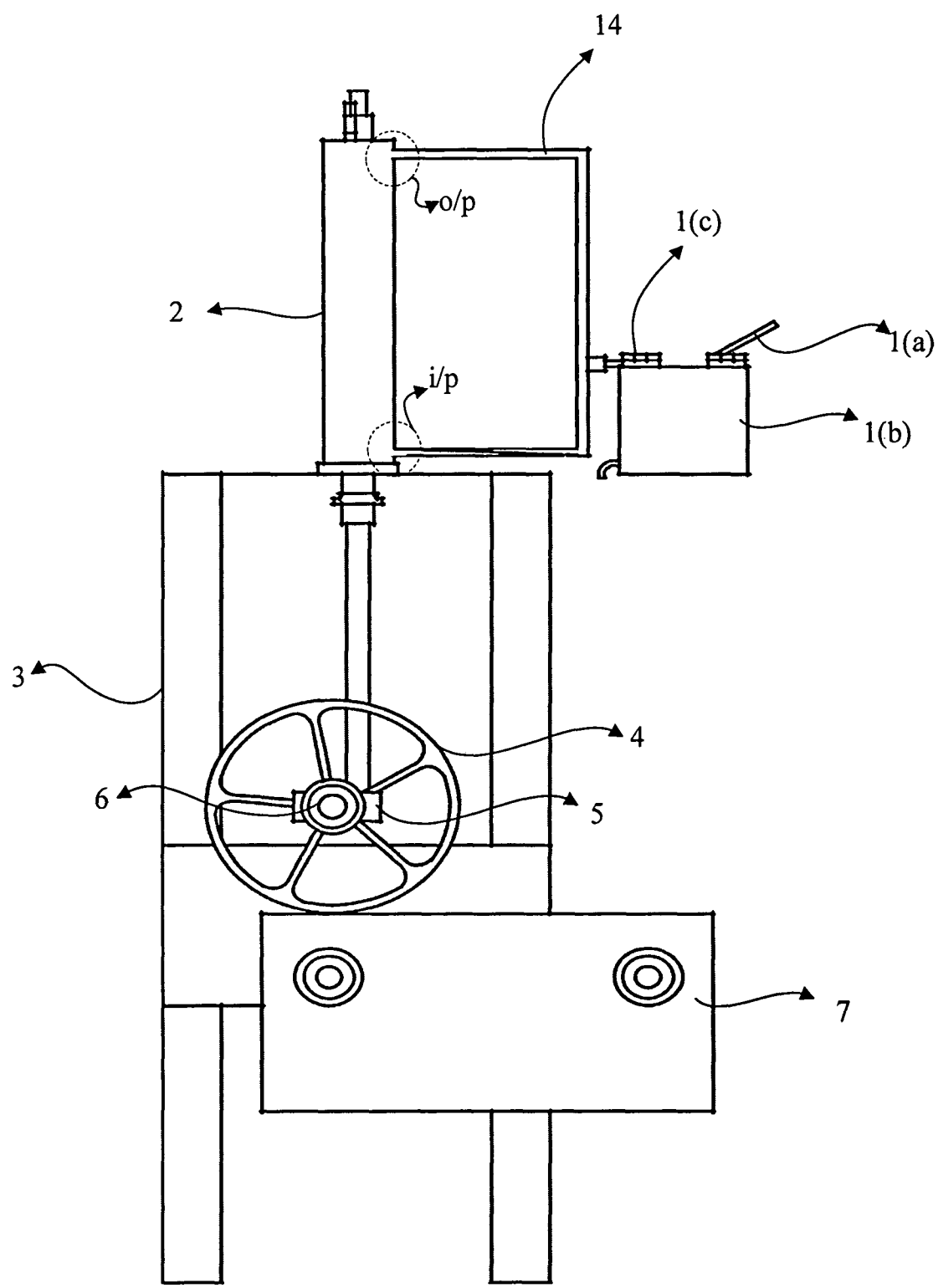
FIG. 2 is the rear view of the system.
Figure 3:
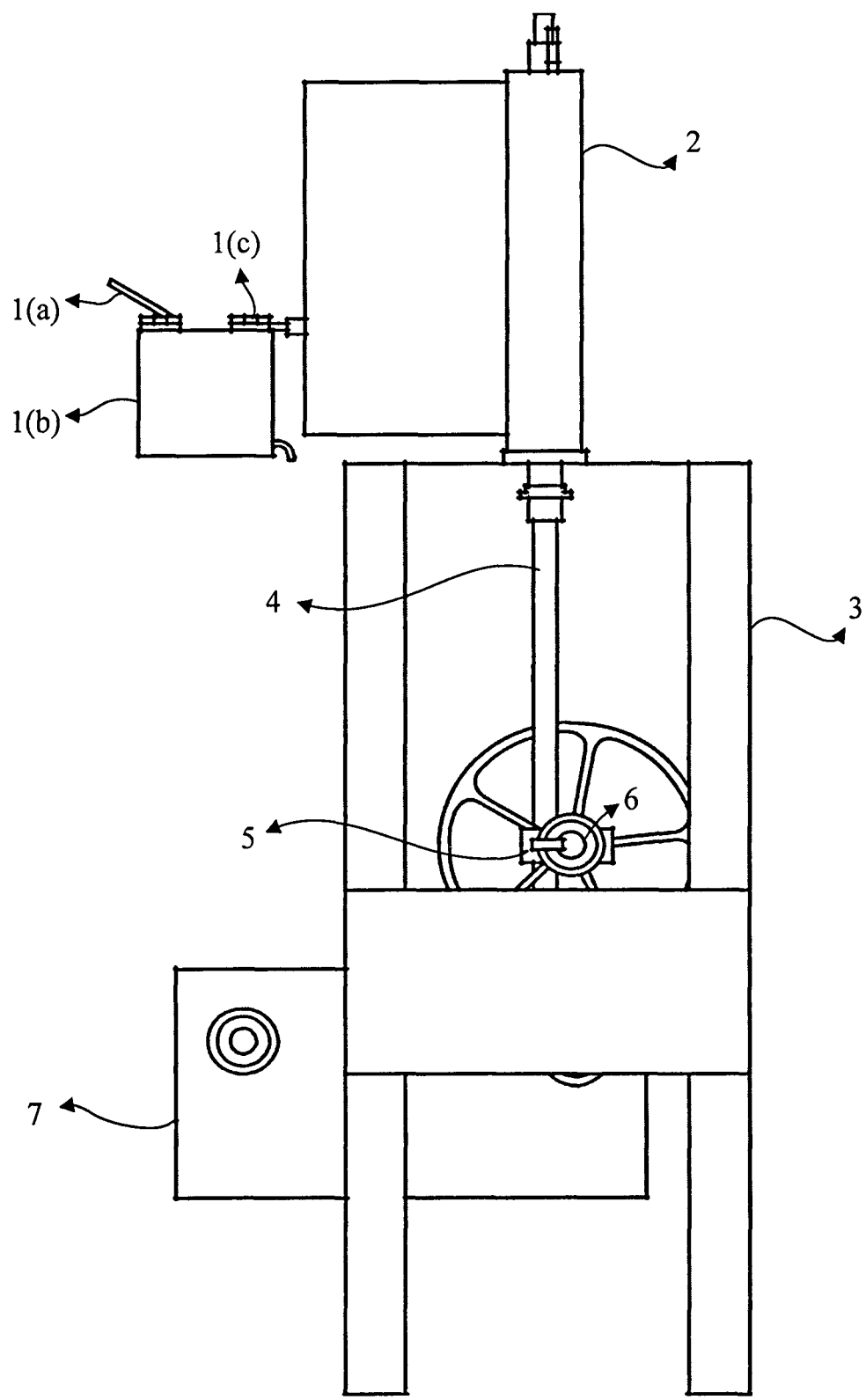
FIG. 3 is the side view of the system.
Figure 4:
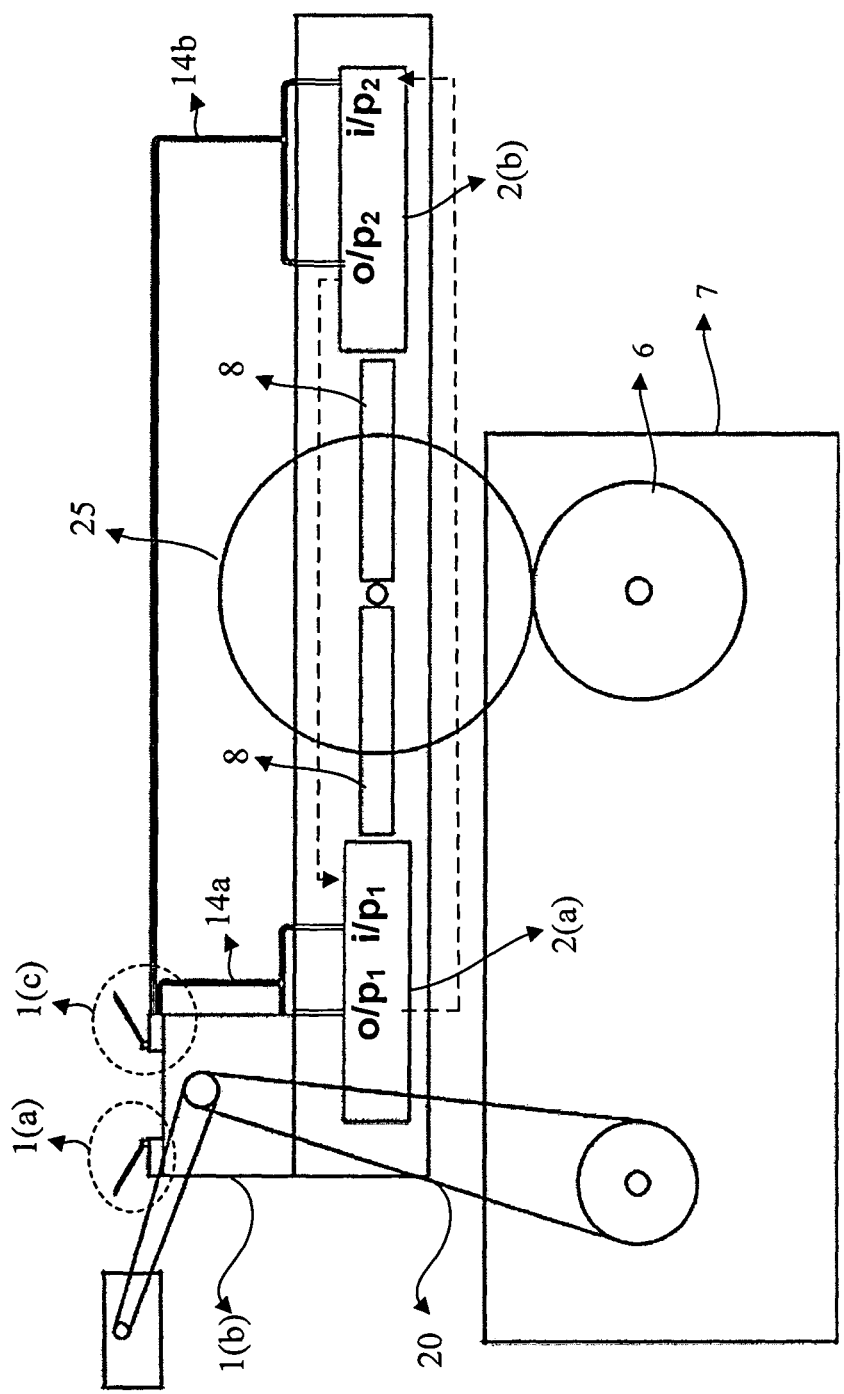
FIGS. 4 and 5 are the schematic layout view of the system projecting the gear mechanisms in the system.
Figure 5:
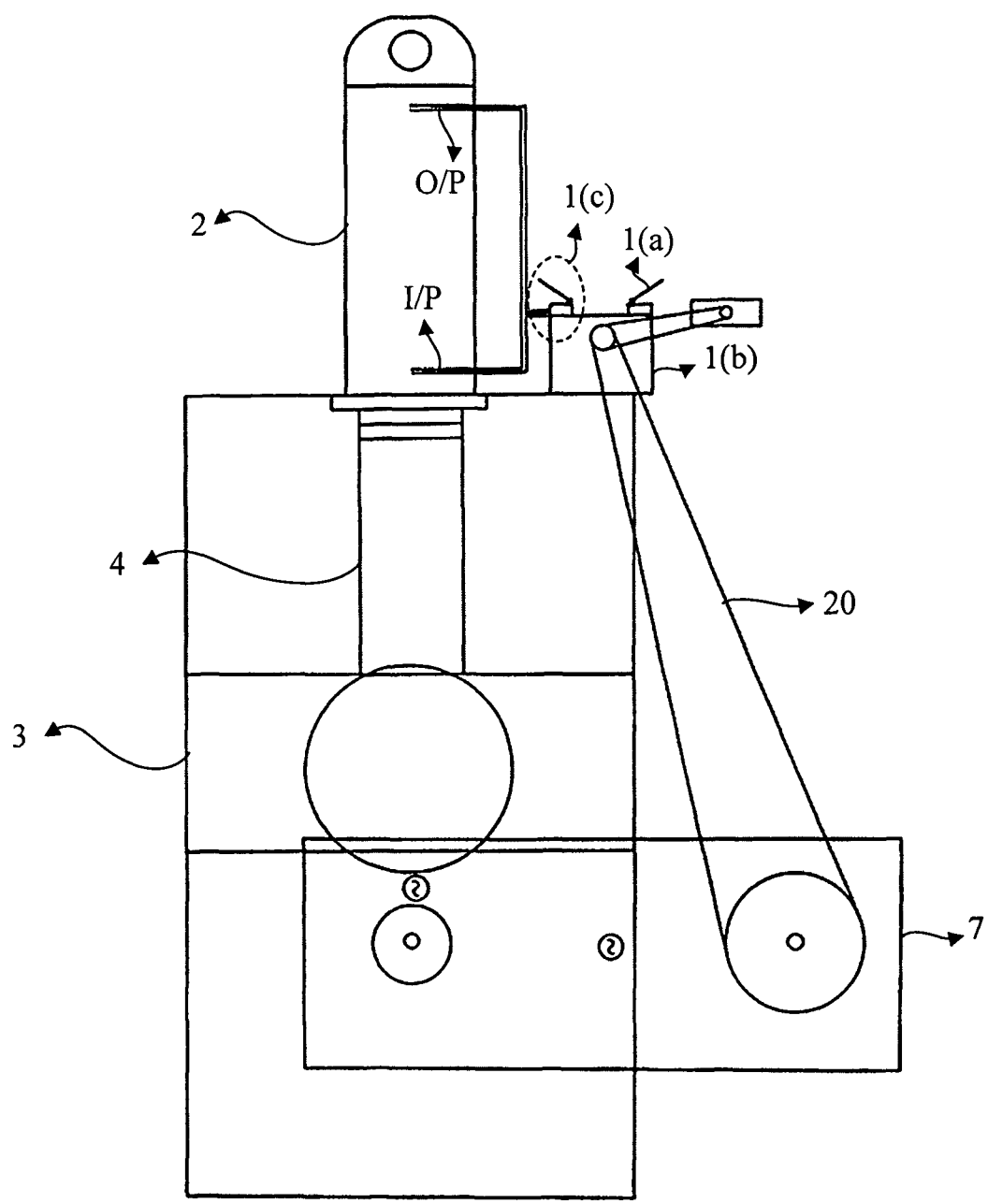
Figure 6:
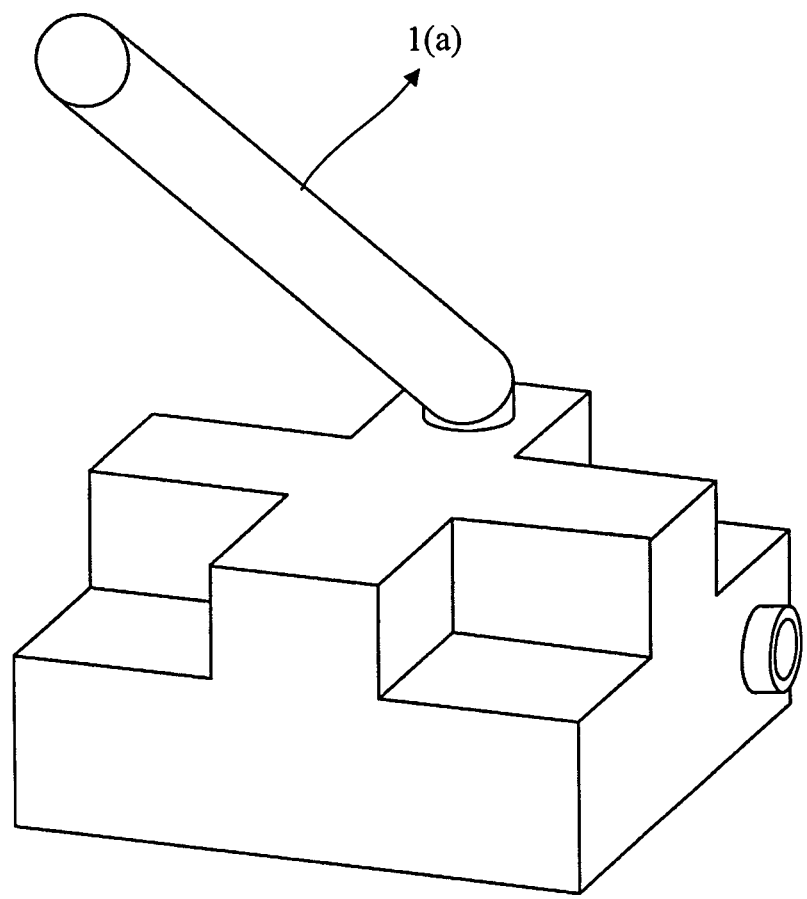
FIG. 6 illustrates the construction of the hand pump provided in the system.
Figure 7:
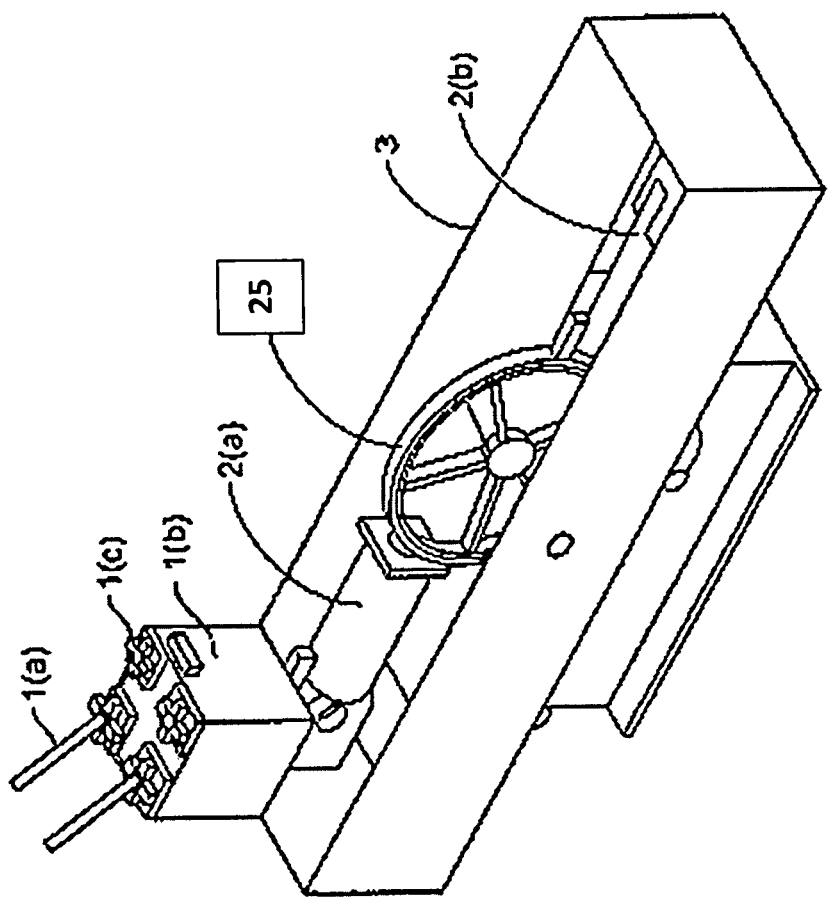
FIG. 7 illustrates the alternative embodiment of the power generation system utilising mechanical driven hand pumps and hydraulic pressure driven double cylinder in the rack and pinion wheel arrangement performing in the bicycle mode of operation under the differential pressure.
Figure 8:
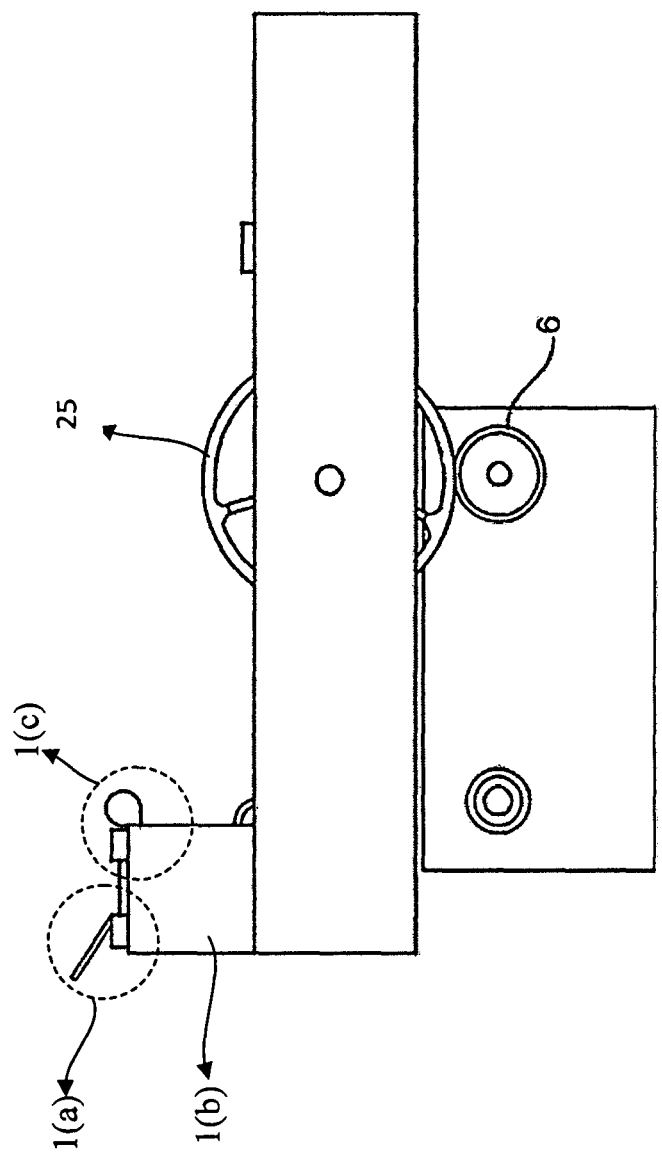
FIG. 8 is the plan view of the alternative embodiment system.

An electrical power generator that is manufactured out of the materials and configured pursuant to a preferred embodiment of the present invention is shown generally in FIGS. 1 and 7. Electrical power generator is utilized as with the electrical generating system and as a component of the electrical generating method of the present invention to generate output electricity, shown as in FIGS. 4 and 5, which can be put to beneficial use to operate a wide variety of electrically powered devices. In FIGS. 1 through 3, the electrical generator is shown in three different views for the easy understanding of the system construction. As set forth above, those skilled in the art will readily understand that the present invention is not so limited and that it may be implemented in various other embodiments as illustrated in FIGS. 7 and 8. As with other generators, the electrical generator of the present invention may be utilized as either the primary or as a back-up source of electrical power. The selection of the components and sizes of the components for electrical generator can be varied, as selected by the manufacturer and/or end user, to provide the desired amount of output electricity with minimum of 1 MW.

The invention is a power generation plant that incorporates new efficient systems and methods of extracting and converting energy through hydraulic pressure system based upon mechanical device. It preferably provides a constant rate of power i.e., twenty-four hours a day for as long as necessary. It is designed to provide alternating current (AC), direct current (DC), or any other desire type of electricity, and a direct mechanical force to perform work or a combination thereof. The invention can be perceived as a device that runs on hydraulic pressure system will be explained in further detail below; the invention is modular in that many of the embodiments described herein may be interconnected to form more complicated systems that may be more properly categorized as multi-stroke systems. Therefore, the use of the term stroke is meant to be illustrative and for explanatory purpose only, and should not be perceived as limiting the claimed invention.

The FIGS. 1 through 6 illustrates an embodiment of a non-polluting human powered hybrid vertical machine with hydraulic drive cylinder for energy generation and transmission comprising of a mechanical drive pump (1a) connected to the fluid reservoir (1b) fitted with drive motor and/or drive chain (1c) for injecting the said fluid through the conduits. The flexible conduits are provided from the bottom outlet of the said fluid reservoir for enabling the frictionless flow of the fluid into the hydraulic pressure cylinders and the flow of the fluid back to the reservoir is executed through the conduit fixed at the top end of the reservoir and the cylinder. A vertical hydraulic cylinder (2) comprises a lower input means is for in letting the said fluid from the said reservoir and a top closed output means is for out letting the said fluid back to the fluid reservoir and thus allowed to be extended and contracted by the inlet, outlet load. Fluid flow through the system due to pressure differentials performs the work. Two examples of such work that can be performed are electricity generation and pumping fluids. Direct mechanical work can be performed as needed as well, depending on the application and environmental circumstances.

A perpendicular frame structure (3) is provided for supporting the said vertical power generating machine that encompasses the hydraulic pressure cylinder at the top end, a rack assembly comprising of opposed, spaced apart longitudinal portions joined by curved end portions, arrayed to form a substantially continuous engaging surface and pinion wheel arrangement (4) provided in the central part of the said frame (3) perpendicularly below the said vertical cylinder (2) for enabling the downward movement of the said cylinder upon the hydraulic pressure. Furthermore, the structural frame supporting the power plant, the support frame, as well as mechanical systems, electronic devices, and general control systems utilized in the operation of this system are not described but they are implied. Control system will need to be employed in any given application of the invention to operate coordinate the timing of the various systems, pumps, multiple return stations, etc. Control systems and electronic devices can include but are not limited to computers, smart boards, motors, microwave devices, sensors and solenoids required to operate, pumps, generator connections and other operational systems. Again, the design of these systems and devices is within the ability of one skilled in the relevant arts without undue experimentation or further invention, and may vary depending on the particular application on which the invention is being implemented.

A lever mechanism (5) is provided at bottom end of the said rack and pinion arrangement (4) for arresting the automatic reverse upward movement of the vertical cylinder (2). A transmission gear (6) provided at the rear end of the arrangement (4) is for storing and transmitting the generated electrical energy through the mechanical movement of the said vertical cylinder (2) and the drive gear (7) is for driving the said pump (1a) through the electrical drive motor and/or chain (1c) for automating the flow of the fluid to and from the fluid reservoir. The non-polluting human powered hybrid vertical machine with hydraulic drive cylinder for energy generation and transmission system comprising the mechanical drive of the vertical cylinder (2) upon the hydraulic pressure on the said rack and pinion arrangement (4) is converted to the electrical energy and the drive gear (7) supplies the energy for automatic operation of the mechanical drive pump (1a) through the electrical motor drive and/or chain (1c). The said frame (3) encompasses the rack and pinion arrangement (4), lever mechanism (5), transmission gear (6) and the drive gear (7). The transmission gear (6)

transmits the generated electrical energy to the transmission lines and the storage batteries.

Fluid flow through the system due to pressure differentials performs the required work. Two examples of such work that can be performed are electricity generation and pumping fluids. Direct mechanical work can be performed as needed as well, depending on the application and environmental circumstances. These calculations and tests are within the abilities of one skilled in the art of power generation and fluid dynamics, enabling them to practice the invention disclosed herein with undue experimentation and further invention. Additionally the diagrams that are presented herein merely serve to facilitate the explanation of the principles of operation of the invented system and its various methods of operation and are not meant to imply exact scale of any particular design that has been engineered for a specific purpose. The relative volumes and configuration of various power plant components, which will vary according to individual needs and certain applications, will be of particular importance to efficiency of results. The physical dimensions of certain features depicted in the figures that follow have been exaggerated in order to more clearly explain the principles taught by this disclosure, and thus it should be understood that the functionality described here is not considered to be limited by physical dimension. The invention can operate in various environments such as but not limited to open atmosphere, combinations thereof and other environments. Placing the invention in a mechanical/hydraulic mechanism enables this type of power plant to operate. It may be entirely self-supplied wherein no additional working fluids or solutions are necessary once the system is filled appropriately and started. The size of this type of the system being placed outside depends upon the amount of work or electricity desired for the purposes of this disclosure, the term mechanism shall be taken to encompass any receptacle, whether open or closed, or formal naturally or made by man.

The system for generating pollution free electrical energy by the mechanical movement of the hydraulic pressure cylinder operates by manually engaging the hand pump (1a) for the supply of the fluid stored in the fluid reservoir (1b) through the inlet means, gradually increasing the hydraulic pressure in the cylinder (2) through the fluid input at the inlet means, activating the mechanical movement of the said hydraulic cylinder (2) over the rack assembly comprising of opposed, spaced apart longitudinal portions joined by curved end portions, arrayed to form a substantially continuous engaging surface and pinion wheel arrangement (4) provided in the said frame (3), controlling the position and movement of the said cylinder (2) by means of the lever mechanism (5) and consequently driving the transmission gear assembly (6) and the driver gear assembly (7) for storing and transmitting the generated electrical energy and for initiating the automatic operation of the said pump (1a). The method of generating pollution free electrical energy by the mechanical movement of the hydraulic pressure cylinder as disclosed above wherein the movement of the said hydraulic cylinder is either vertical or horizontal.

The alternative embodiment of the invention is described in FIGS. 7 through 8 wherein the hydraulic pressure cylinders (2a, 2b) are each a single circular type double acting cylinder in which one end of the connecting rod (1) is connected to the pressure cylinder through a fly wheel arrangement, and in the first embodiment in which they are different from each other in size, they are driven with similar driving hydraulic fluids as shown in FIG. 7. Therefore, unless otherwise distinguished, a driving hydraulic fluid of the boom cylinders is explained as an example, and as concerns driving hydraulic fluid of the other cylinder, only the different points will be described.

Figure 7A:
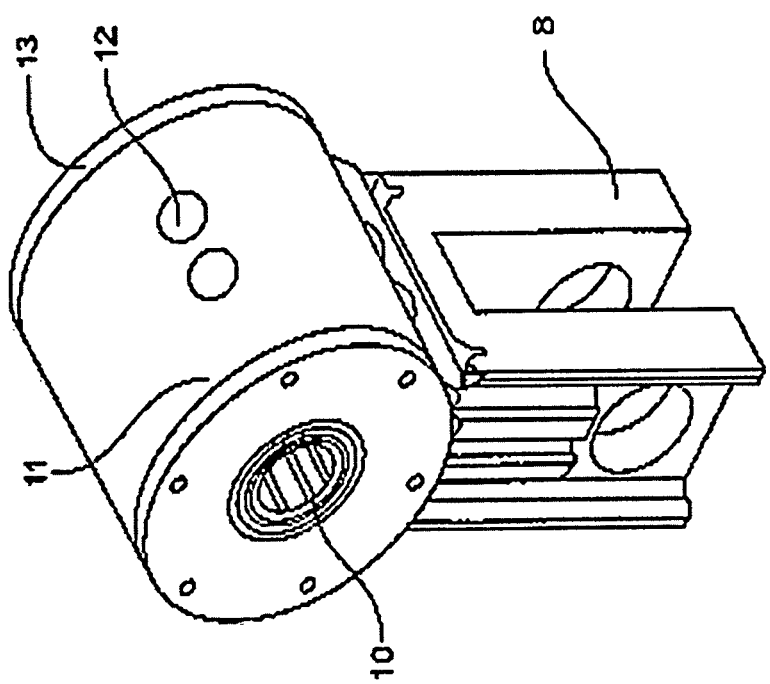
FIG. 7(a) illustrates another embodiment of the bicycle mode of operation held together by the connecting rod with the help of freewheel to the fly wheel.

Another embodiment of the invention is described in FIG. 7(a) where in one end of the connecting rod (8) of the double acting cylinders is coupled with freewheel (10) arrangement to the fly wheel which comprises a bearing (11), lock pin (12) and bearing cover (13).

The non-polluting human powered hybrid horizontal machine with dual hydraulic drive cylinder for energy generation and transmission comprises at least two horizontal hydraulic cylinders (2a, 2b) with inlet mechanism for receiving the fluid from the fluid reservoir (1b), at least two inputs and two outputs provided at the either ends of the said horizontal hydraulic cylinders (2a, 2b), at least two flexible connecting conduits engaging the input of cylinder (2a) with the output of the cylinder (2b) and the output of cylinder (2a) with the input of the cylinder (2b), a connecting rod (8) positioned in between the said at least two horizontal hydraulic double cylinders (2a, 2b), fly wheels (25) engaged with the said connecting rod for providing the bicycle mechanism movement to the said double cylinders, a fluid reservoir (1b) containing the fluid positioned at the first end of the said hydraulic cylinder (2) being driven mechanically by the pump (1a), electric motors and/or drive chains (1c) electrically connected to the said pump (1a) is supplied power by the driver gear (7) and a transmission gear (6) in driving contact with the said pinion wheel arrangement (4) for converting the mechanical movement of the said hydraulic horizontal cylinder (2) into electrical energy.

The oil stored in the fluid reservoir (1b) is initially forced into the said one of the double hydraulic cylinders from the oil reservoir (1b) through the mechanical pumps (1a) provided at the upper portion of the said fluid reservoir. The fluid pressured by the mechanical hand pump is conveyed through the at least two flexible conduits between the said double hydraulic pressure cylinders (2a, 2b). The hydraulic pressure cylinders (2a, 2b) are each a single circular type double acting cylinder in which one end of the connecting rod is connected to the pressure cylinder through a fly wheel arrangement (4), and in the first embodiment in which they are different from each other in size, they are driven with similar driving hydraulic fluids as shown in FIG. 7. Therefore, unless otherwise distinguished, a driving hydraulic fluid of the boom cylinders is explained as an example, and as concerns driving hydraulic fluid of the other cylinder, only the different points will be described.

The balanced pressure created by the flowing fluid inside the said double hydraulic cylinders introduces the movement of the said cylinders in the horizontal direction through the connecting rods fixed along with the fly wheels. This mechanical movement of the double hydraulic pressure cylinder is in the form of a bicycle mode of movement maintaining a constant pressure difference between the said two cylinders. The non-polluting human powered hybrid horizontal machine with hydraulic drive cylinder for energy generation and transmission as illustrated in FIGS. 7 and 8 wherein the fluid from the reservoir is conveyed inter alia between the said double cylinders through the said flexible conduits and the system provides a bicycle mechanism for the generation of electric power between the said double cylinders through the said fly wheels connecting the rod and the cylinders.

The mode of operation of this alternate embodiment for the continuous power generation is based on the fluid pressure balance between the said double hydraulic drive cylinders connected by means of a connecting rod engaging the fly wheels between them for the ease of the mechanical movement to exist between the cylinders which inadvertently rotates the gears for continuous power generation. The flow of the fluid into the hydraulic cylinders is executed by the double elastic conduits provided at least two in each of the said cylinders for the inlet and outlet into and from the cylinders. The fluid flow in the cylinders and between the said double hydraulic cylinders induces the pressure for the continuous bicycle movement between the said cylinders resulting in the rotation of the gear mechanism positioned in connection with the said double cylinders. This bicycle mode of operation is held together by the frictionless connecting rod with the help of the freewheel arrangement to the fly wheel existing between the said cylinders.

Although this specification discloses the invention primarily using hydraulic in its operation, for a particular application and there is no adverse impact on the environment. This type of power plant can be built and operated as a source fir distributed allocation of electric power allowing it to provide electricity to a power grid system. Connecting the invention to a power grid system would allow the power plant to provide electricity to large regions such as but not limited to towns, cities, countries, districts, provinces and states. The invention can also be implemented as a single free standing unit of a system of interconnecting units to provide electricity to specific facilities such as but not limited to: manufacturing plants, shopping malls, stores, office building, hospitals, military bases, multifamily residences as well as other facilities. Additionally, the invention can be implemented as a portable unit to provide electricity for commercial functions like fairs and construction sites, private uses like camping and recreation, as well as providing electricity to other entities and other functions. The system is scalable in size, for example being scaled down to power the operation of the invention tank. Whether external or self-contained allows this system to be utilized in various environments as a source for distributed allocation of electricity either as a single free standing unit or a combined system.

Any embodiment of the present invention may include any of the optional or preferred features of the other embodiments of the present invention. The exemplary embodiments herein disclosed are not intended to be exhaustive or to unnecessarily limit the scope or the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the invention, therefore, to limit the invention only as indicated by the scope of the claims. The present invention is to create and protect the same technical equipment, the same technical content and the same technical principles of the constitution, of the model request the same protection of intellectual property rights. The present invention is to create a low cost energy, zero emissions, fuel cost, of new energy power machine. The key is technical devices, technical construction and technical content as its external shape. As there are a great variety of shapes, the key is their technical structure, device, content have their own characteristics, not their relative net. Therefore, the present invention is to create a technical device, structure, content is the most critical and key request the same protection of intellectual property rights.

I claim:
1. A non-polluting hybrid vertical power generating machine with hydraulic drive cylinder for energy generation and transmission comprises of:
   i) a mechanical drive pump (1 a) connected to a fluid reservoir (1 b) fitted with a drive motor (1 c) for injecting the said fluid through conduits (14);
   ii) a vertical hydraulic cylinder (2) with a lower input end (I/P) for in letting the said fluid from the said reservoir and a top closed output end (O/P) for out letting the said fluid back to the fluid reservoir and thus allowed to be extended and contracted by the inlet, outlet load;
   iii) a perpendicular frame (3) for supporting the said vertical power generating machine encompasses the said cylinder (2) at top end of the perpendicular frame (3);
   iv) a rack assembly comprising of opposed, spaced apart longitudinal portions, arrayed to form a substantially continuous engaging surface and a pinion wheel arrangement (4) provided in the said frame (3) perpendicularly below the said vertical cylinder (2) for facilitating the down movement of the said cylinder upon the hydraulic pressure;
   v) a lever mechanism (5) provided at bottom end of the said rack and pinion wheel arrangement (4) for arresting the reverse upward movement of the vertical cylinder (2);
   vi) a transmission gear (6) whose one end is rotatably connected to the rear end of the pinion wheel arrangement (4) and other end is coupled to a generator, wherein the generator converts the rotation movement of the transmission gear (6) into electrical energy, and
   wherein the said pump (1 a) is automatically driven through the electrical drive motor (1 c) using the generated electric energy for automating the flow of the fluid to and from the fluid reservoir.

2. The non-polluting hybrid vertical power generating machine with hydraulic drive cylinder for energy generation and transmission as claimed in claim 1, wherein the mechanical drive of the vertical cylinder (2) upon the hydraulic pressure on the said rack and pinion arrangement (4) is converted to the electrical energy by the generator.

3. The non-polluting hybrid vertical power generating machine with hydraulic drive cylinder for energy generation and transmission as claimed in claim 1, wherein the said frame (3) encompasses the rack and pinion arrangement (4), lever mechanism (5), transmission gear (6) and a drive gear (7), wherein the pinion wheel arrangement (4) is mechanically coupled to the drive gear (7) such that the said pump (1 a) is automatically operated through a drive chain (20) disposed between the drive gear (7) and pump (1 a).

4. The non-polluting hybrid vertical power generating machine with hydraulic drive cylinder for energy generation and transmission as claimed in claim 1, wherein the electrical energy generated by the generator corresponding to the rotation movement of the transmission gear (6) is transmitted to the transmission lines and/or stored in the storage batteries.

5. A non-polluting hybrid horizontal machine with dual hydraulic drive cylinder for energy generation and transmission comprises:
   i)(a) At least two horizontal hydraulic cylinders comprising a first horizontal hydraulic cylinder (2a) and a second horizontal hydraulic cylinder (2b); and
   (b) A fluid reservoir (1 b) containing the fluid positioned at the first end of the said hydraulic cylinder (2a, 2b), wherein the fluid in the fluid reservoir (1 b) is being driven by a, mechanical drive pump (1 *a*) for injecting the said fluid through conduits (14*a*, 14*b*);

ii) At least two inputs (I/P$_1$, I/P$_2$) and two outputs (O/P$_1$, O/P$_2$) provided at the either ends of the said first and second horizontal hydraulic cylinders (2 *a*, 2 *b*), respectively, wherein the at least two inputs (I/P$_1$, I/P$_2$) for receiving fluid from a fluid reservoir (1*b*) and the at least two outputs (O/P$_1$, O/P$_2$) for out letting the said fluid back to the fluid reservoir (1*b*);

iii) At least two flexible connecting conduits (14*a*, 14*b*) engaging the input of the first horizontal hydraulic cylinder (2 *a*) with the output of the second horizontal hydraulic cylinder (2 *b*) and the output of the first horizontal hydraulic cylinder (2 *a*) with the input of the second horizontal hydraulic cylinder (2 *b*);

iv) A connecting rod (8) positioned in between the said at least two first and second horizontal hydraulic cylinders (2 *a*, 2 *b*);

v) Fly wheel arrangement (25) engaged with the said connecting rod (8), wherein the fly wheel arrangement (25) is rotated relative to the mechanical movement of the first and second horizontal hydraulic cylinders (2 *a*, 2 *b*); and vi) A transmission gear (6) whose one end in driving contact with the said fly wheel arrangement (25) and other end is coupled to a generator, wherein the generator converts the rotation movement of the transmission gear (6") into electrical energy, and wherein the said pump (1 *a*) is automatically driven through the electrical drive motor and fl c) using the generated electric energy for automating the flow of the fluid to and from the fluid reservoir.

6. The non-polluting hybrid horizontal machine with hydraulic drive cylinder for energy generation and transmission as claimed in claim 5, wherein the said fluid in the fluid reservoir (1 *b*) is oil.

7. The non-polluting powered hybrid horizontal machine with hydraulic drive cylinder for energy generation and transmission as claimed in claim 5, wherein i) The fluid from the reservoir is conveyed inter alia between the said double cylinders through the said flexible conduits (14*a*, 14*b*); and ii) The system provides a bicycle mechanism for the generation of electric power between the said double cylinders through the said fly wheels connecting the rod and the cylinders.

* * * * *